(12) United States Patent
Balasubramanian et al.

(10) Patent No.: US 10,169,884 B2
(45) Date of Patent: Jan. 1, 2019

(54) IMAGE-BASED DEVICE CONFIGURATION (71) Applicant: INTERNATIONAL BUSINESS MACHINES CORPORATION, Armonk, NY (US)

(72) Inventors: Swaminathan Balasubramanian, Troy, MI (US); Radha M. De, Howrah (IN); Ashley D. Delport, Durban (ZA); Indrajit Poddar, Sewickley, PA (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 55 days.

(21) Appl. No.: 15/397,071

(22) Filed: Jan. 3, 2017

(65) Prior Publication Data

US 2018/0189970 A1  Jul. 5, 2018

(51) Int. Cl.
*G06K 9/00* (2006.01)
*G06T 7/70* (2017.01)
(Continued)

(52) U.S. Cl.
CPC ............ *G06T 7/70* (2017.01); *G06F 3/04842* (2013.01); *H04L 67/125* (2013.01); *H04N 7/185* (2013.01); *H04N 7/18* (2013.01)

(58) Field of Classification Search
CPC .. G06T 7/70; G06K 19/0717; G06K 7/10168; G06K 7/10405; G06K 9/6253; G06K 9/46; G06K 9/00771; G06K 9/6217; G06K 17/1443; G06F 3/04842; G06F 3/0482; G06F 3/04886; G06F 3/04845; G06F 3/1204; G06F 3/1226; G06F 3/1229; G06F 3/126; G06F 3/1292; G06F 3/005; G06F 9/44; G06F 9/45533; G06F 11/3089; H04L 67/12; H04L 67/025; H04L 67/10; H04L 67/125; H04L 67/04; H04L 67/104; H04L 67/16; H04L 12/2803; H04L 12/856; H04L 12/2816; H04L 63/04; H04L 63/10; G08C 17/02; G08C 19/28; G08C 2201/20; G08C 2201/21; G08C 2201/40; G08C 2201/92; G08C 2201/93; H04N 7/185; H04N 2005/4428; H04N 2005/4435; H04N 5/4403; H04N 5/765; H04N 21/42222; H04N 21/42225; H04N 21/4131; H04N 21/43615; H04N 21/4432; H04N 21/4437; H04N 21/818; A47L 15/0063; A47L 15/4293; A47L 2401/03; A47L 2401/34; A47L 2501/26; A47L 2501/30;
(Continued)

(56) References Cited

U.S. PATENT DOCUMENTS

8,229,161 B2   7/2012  Hudnut et al.
2015/0009022 A1  1/2015  Cho et al.
(Continued)

*Primary Examiner* — Jose L Couso
(74) *Attorney, Agent, or Firm* — Griffiths & Seaton PLLC (57) ABSTRACT

Embodiments for processing an image by a processor. The image may be analyzed for one or more identified image elements. An action to be performed by a device, interconnected in an Internet of Things (IoT) Network, may be associated based on the one or more identified image elements. One or more settings of the device may be preconfigured to perform the action.

18 Claims, 5 Drawing Sheets

(51) Int. Cl.
*H04L 29/08* (2006.01)
*G06F 3/0484* (2013.01)
*H04N 7/18* (2006.01)

(58) Field of Classification Search
CPC .... A47L 2501/34; A47J 37/00; D06F 39/005;
F25D 2400/361; H05B 33/0854; H05B
37/0218; H05B 37/0236; Y02B 20/48;
H04W 4/70; H04W 4/80; H04W 4/023;
H04W 4/08; H04W 4/21; G05B 17/02;
G06N 5/043
See application file for complete search history.

(56) References Cited

U.S. PATENT DOCUMENTS

| | | | |
|---|---|---|---|
| 2016/0014192 A1 | 1/2016 | Lim et al. | |
| 2016/0066389 A1* | 3/2016 | Allen | H01L 33/507 |
| | | | 313/503 |
| 2016/0285708 A1* | 9/2016 | Papadopoulos | H04L 67/10 |
| 2016/0344815 A1* | 11/2016 | Hyun | H04L 67/125 |
| 2017/0090840 A1* | 3/2017 | Hardikar | G06F 3/1226 |
| 2017/0185276 A1* | 6/2017 | Lee | G06F 3/04847 |
| 2017/0287335 A1* | 10/2017 | Ansari | G08G 1/166 |
| 2017/0318360 A1* | 11/2017 | Tran | A63B 69/36 |
| 2017/0336858 A1* | 11/2017 | Lee | H04N 7/18 |
| 2017/0345268 A1* | 11/2017 | Cho | G08B 13/19676 |
| 2018/0054487 A1* | 2/2018 | Hebsur | H04L 67/12 |

* cited by examiner

IMAGE-BASED DEVICE CONFIGURATION

BACKGROUND OF THE INVENTION

Field of the Invention

The present invention relates in general to computing systems, and more particularly to, various embodiments for configuring settings for various computer-controlled devices using image analysis.

Description of the Related Art

Computing systems may be found in the workplace, at home, or at school. Such computing systems may include fixed robot devices, such as within an automotive factory or production line. In this way, performance costs are controlled and maintained. Moreover, the computing systems can include an Internet of Things (IoT), which is the interconnection of computing devices scattered across the globe using the existing Internet infrastructure. IoT devices may be embedded in a variety of physical devices or products, such as home appliances, manufacturing devices, industrial printers, automobiles, thermostats, smart traffic lights, vehicles, buildings, etc.

SUMMARY OF THE INVENTION

Various embodiments for configuring settings for various computer-controlled devices using image analysis by a processor, are provided. In one embodiment, by way of example only, a method for image-based device configuration, again by a processor, is provided. The image may be analyzed for one or more identified image elements. An action to be performed by a device, interconnected in an Internet of Things (IoT) Network, may be associated based on the one or more identified image elements. One or more settings of the device may be preconfigured to perform the action.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include thermostats, sensor based devices, smoke alarms, lights, home appliances, audio systems, televisions, security cameras, security sensors, and heating, ventilation, and air conditioning (HVAC) zones, among countless other examples. Many of these objects are devices that are independently operable, but they may also be paired with a control system or alternatively a distributed control system such as one running over a cloud computing environment.

The prolific increase in use of IoT appliances in computing systems in a variety of settings provide various beneficial uses to a user. Accordingly, the present invention provides a solution to enable activities such as, for example, remote settings selection for home appliances such as washing machines, dryers, microwaves, temperature selections in HVAC thermostat settings, alarm system settings, home theater settings, and the like. More specifically, the mechanisms of the illustrated embodiments provide for processing (analysis) of an image, captured by an IoT device, to identify elements within the image and provide remote controlling of IoT devices. Said differently, the present invention processes an image to remotely select the settings for an associated IoT device. For example, the remote selection of correct settings in a washing machine (having IoT device computing components) may be performed based on an image or video of dirty laundry captured by a camera of a user.

The mechanisms of the present invention provide useful, novel functionality for configuring settings for various computer-controlled devices, interconnected in an Internet of Things (IoT) Network, using image analysis by analyzing images for one or more identified image elements. An action to be performed by a device may be associated with the device based on the one or more identified image elements. One or more settings of the device may be preconfigured to perform the action.

In one aspect, a target or "boundary" region may be selected from a displayed image of an image capturing device. One or more tasks may be defined in relation to a plurality of objects displayed within the defined target region such that the defined one or more tasks are arranged according to a task workflow. The defined one or more tasks may be communicated to a self-directed mobile device, such as, for example a robot device, thereby assigning the self-directed mobile device to perform the defined one or more tasks according to the task workflow.

It should be noted that data is increasingly processed through a variety of geographically disbursed computing components, where, for example, a local node may contain a set of data processing components yet remain in remote communication with other portions of the distributed data processing system. To with, an image capturing device and/or an IoT device's data may not be locally stored or processed on the user's local computer, but is instead hosted by one or more distributed storage components that are in remote communication with the local computer. This type of data storage may, in some cases, be referred to as "cloud," or "cloud-based" storage.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
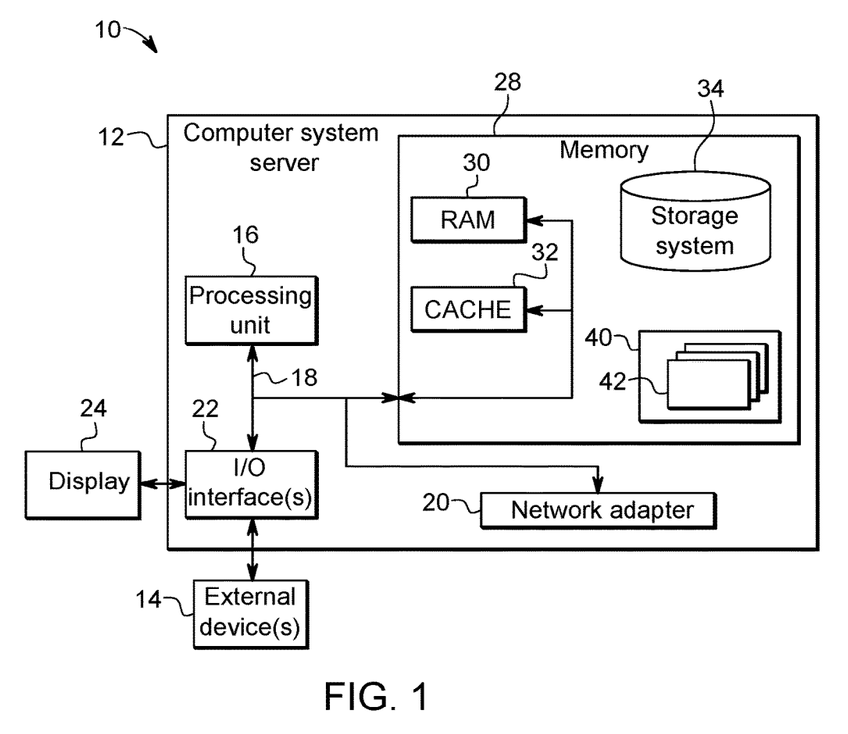
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
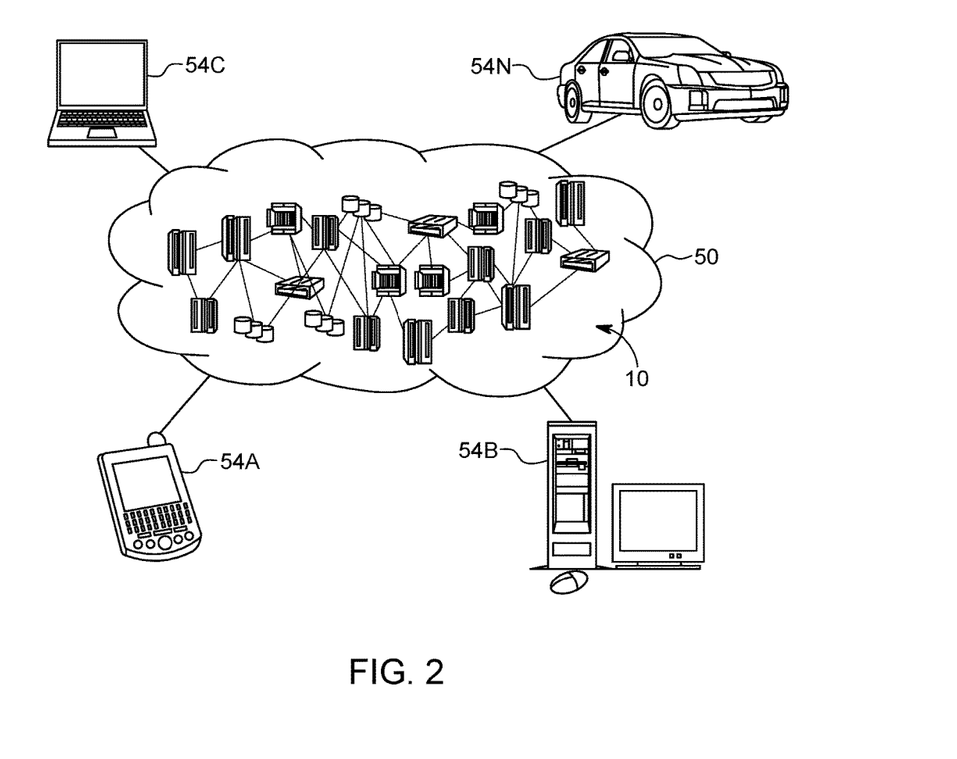
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
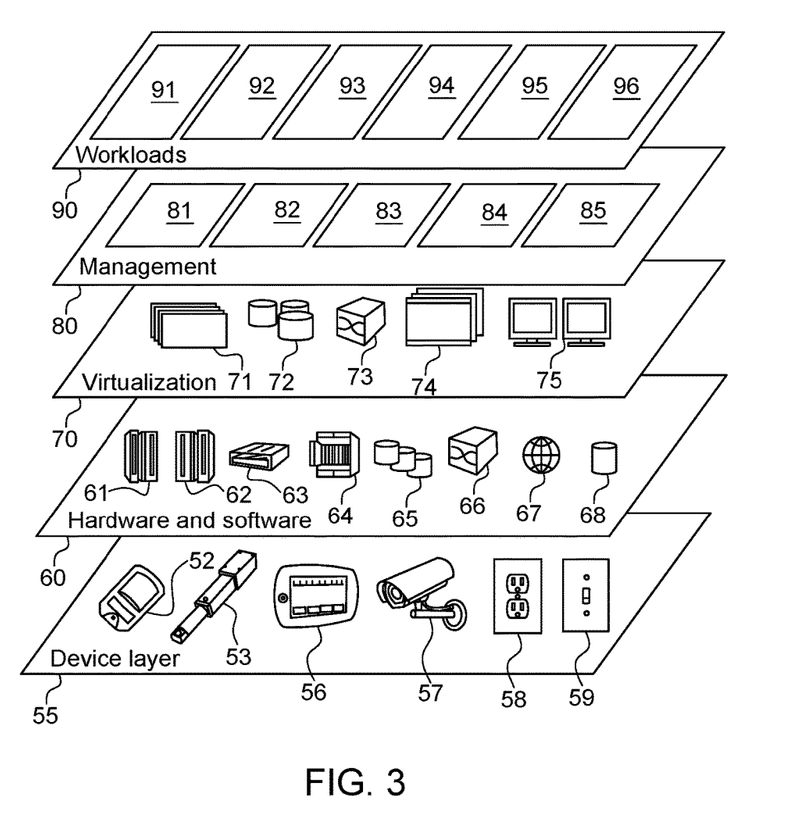
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices using image analysis workloads and functions 96. In addition, configuring settings for various computer-controlled devices using image analysis workloads and functions 96 may include such operations as data analysis (including data collection and processing from various environmental sensors), image analysis, task and device analysis, and/or data analytics functions. One of ordinary skill in the art will appreciate that the configuring settings for various computer-controlled devices using image analysis workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the configuring settings for various computer-controlled devices using image analysis. An image may be analyzed and one or more tasks (or activities) may be assigned to the image. One or more IoT devices, such as a home appliance, may be selected that may be related to the task. One or more settings of each IoT device may be preconfigured in order to carry out and perform the task. For example, a user may capture an image that may be analyzed to identify an activity that is most likely associated with the image. Based on the identification, one or more household devices related to the activity may be selected. For each one of the selected devices, a configuration that contains the settings is communicated to the IoT device in order to perform the activity.

In one embodiment, the configuration settings to enable the IoT device to perform a task according to an analyzed image may be based on a variety of task assignments, metadata, and captured image information. This information may include among other details, for example, the type of image capturing device, time of photography, focal length setting, shutter speed setting, lens and lens size information, two-dimensional (2D) object data, three-dimensional (3D) object data, and touch screen capability and functionality.

Figure 4:
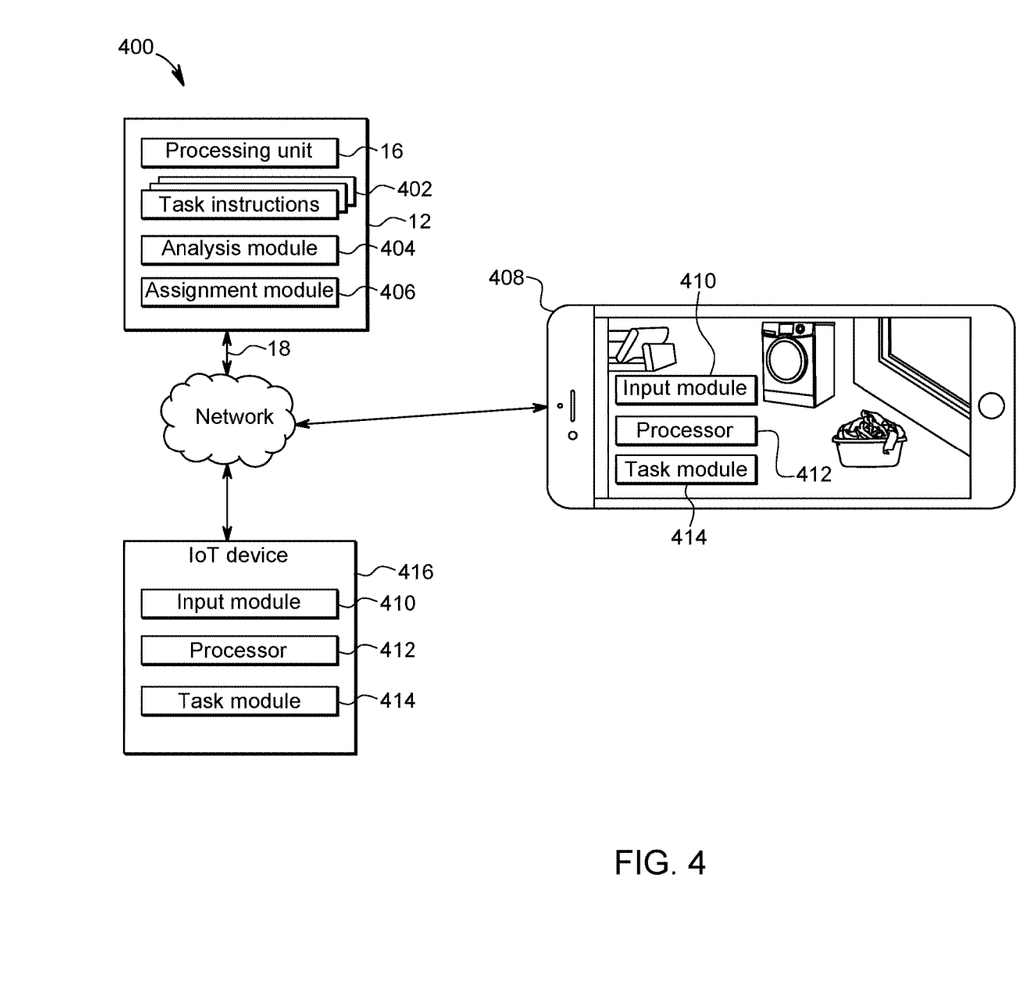
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. In one aspect, each of the devices, components, modules, and/or functions described in FIGS. 1-3 may also apply to the devices, components, modules, and functions of FIG. 4. Also, one or more of the operations and steps of FIGS. 1-3 may also be included in one or more operations or actions of FIG. 4. Computer system/server 12 is again shown, incorporating processing unit 16 to perform various computational, data processing and other functionality in accordance with various aspects of the present invention. A database of task (or activity/action) instructions (e.g., a knowledge domain or ontology) 402 is shown, along with an analysis module 404 and an assignment module 406. That is, actions (e.g., tasks or activities) may be identified and/or interpreted for the received images with a keyword dictionary or ontology (e.g., a lexical database ontology), which may be associated with the central server, the cloud computing network, the local area network server, and/or the computing system of the IoT devices including an image capturing device.

FIG. 4's components 400 as shown may also include an image capturing or recording device, such as image capturing device 408 and one or more IoT devices 416. In one aspect, the image capturing device may include a smart phone, video camera, a camera, a tablet, computers, handheld devices, IoT device and the like. The image capturing device 408 and IoT device 416 may be connected via communication channels (e.g., bus 18) through the network to the computer system/server 12 as shown. In one exemplary embodiment, a user may find themselves in a location where they desire to take a photo. The image capturing device 408 of the user may have already located, and connected to, a wireless network. The image capturing device 408 may then connect through the local wireless network through the Internet to the computer system/server 12 to provide context metadata and, in turn, receive settings information and/or instructions from the computer system/server 12.

The image capturing device 408 and IoT device 416 may incorporate additional functional components 400 such as the depicted input module 410, processor 412, and task module 414 (e.g., task selection and/or task execution module). Here again, the use of an input module 410 and task module 414 are merely for illustrative convenience as a variety of functional components 400 may be integrated into the image capturing device 408 and IoT device 416 to accomplish specific functionality to further the mechanisms of the illustrated embodiments.

Input module 410 may, in one embodiment, serve to receive image information provided by the image capturing device 408 and IoT device 416. For example, once the user snaps a candidate image or video, the input module 410 may receive input commands or selected data from text, markings and/or commands input into a touch screen or graphical user interface (GUI). For example, a menu option displaying a menu and/or list of a variety of tasks or subtasks via the GUI on the image capturing device 408 may be used to select the tasks or subtasks. The input module 410 may also receive a command to communicate the image to the computer system/server 12. The input module 410 may separate the commands from the image to be provided to the computer system/server 12. The relative position may also be provided through the input module 410 by a user's own input, or by other devices, such as 2D and/or 3D imaging and positioning models or sensors or Global Positioning System (GPS) sensor devices to indicate location. A variety of input data may pass through the input module 410 to be processed by the computer system/server 12.

In similar fashion, the task module 414 may function for task communication between the image capturing device 408 and IoT device 416, so for example, when the image capturing device 408 communicates the captured image to the computer system/server 12, the computer system/server 12 provides to the task module 414 on the IoT device 416 the task/activity settings, target areas, tasks/activities, instructions associated with the task/activity, images, object positioning data, other data, and/or a combination thereof. The computer system/server 12 may provide such data as saved task/activity instructions, task/activity assignments, defined tasks/activities according to the task/activity workflow, or a variety of other data that may pass through and be received by the task module 414. The task module 414 may query or provide a menu option to a user, in one embodiment, whether they wish to provide, update, define, change one or more target areas, objects within the target area, tasks and instructions, and/or provide other configurations and ontological data in association with the tasks on the image capturing device 408 and IoT device 416. This functionality may be provided by a graphical user interface (GUI) on the image capturing device 408, which provides information to/from the computer system/server 12 and/or IoT device 416, or receives input and/or selection data from the user.

As one of ordinary skill in the art will appreciate, the depiction of the various functional units in computer system/server 12 is for purposes of illustration, as the functional units may be located within computer system/server 12 or elsewhere within and/or between distributed computing components. The task instructions 402 may include a data repository of various tasks or chores and/or additional metadata information that is obtained from previously obtained images and defined tasks or chores. The images themselves may also be stored in a corresponding database, which is not shown for purposes of illustrative convenience.

In an additional aspect, the analysis module 404 and assignment module 406 of the computer system/server 12 may work in concert with processing unit 16 to accomplish various aspects of the present invention. For example, analysis module 404 may undergo various data analytics functions associated with the task instructions 402 to identify and/or interpret a defined task that may be new and/or associated with previously stored task instructions or images. The analysis module 404 and/or assignment module 406 may also receive a captured image from the image capturing device 408 and analyze the image for one or more identified image elements. One or more settings of the device, such as IoT device 416, may be preconfigured to perform the action (e.g., task or activity) based on the one or more identified image elements by the assignment module 406 and communicated to an IoT device, such as IoT device 416.

The analysis module 404 and/or assignment module 406 may also select an IoT device, such as IoT device 416, from an available plurality of IoT devices to perform the action. Based on the one or more identified image elements, one or more settings of an additional device may be preconfigured for performing an additional action in sequence with the action associated with the device.

Pursuant to identifying the image elements, a physical property associated with the image may be estimated, by the analysis module 404 and/or assignment module 406, to be subsequently used in determining one or more aspects of the performed action. Pursuant to estimating the physical property associated with the image by the analysis module 404 and/or assignment module 406, a mass, an area, a volume, a length, a width, a height, a color, a temperature, an odor, an appearance, a texture, a density, a viscosity, a velocity, a location, an intensity, a luminance, a luminescence, a luster, or a concentration may also be estimated. The analysis module 404 and/or assignment module 406 may also query the image capturing device 408 (e.g., user) for additional data supplanting the one or more identified image elements to associate the action.

The analysis module 404 may also interpret a relative position of each selected object relative to each other in a captured image that is associated with the defined tasks or activities. Assignment module 406 may make decisions in conjunction with the analysis module 404 to identify, select, and provide additional tasks, if needed, to enable the IoT device 416 to perform the defined tasks, activities and instructions. As one of ordinary skill in the art will appreciate, the assignment module 406 and analysis module 404 may implement mathematical modeling, image processing, or other data processing technologies to carry out the various mechanisms of the illustrated embodiments.

Consider the following example of an implementation of the aforementioned functionality. In one aspect, using an image capturing device such as, for example, a handheld device (e.g., a smartphone or camera), a user may capture an object or image. A component operating on the image capturing device may transmit the image to a central processing unit for analysis or may perform the analysis thereon. For example, the CPU may be a home Wi-Fi router that may communicate with each IoT device. The CPU and/or the image capturing device may analyze the captured image as follows. The image may be identified such as, for example, by using a cognitive application for visual recognition. For example, a laundry basket with dirty clothes, a shopping cart with items, or a baking tray may be captured as the image. A physical property associated with the image such as, for example, a mass, an area, a volume, a length, a width, a height, a color, a temperature, an odor, an appearance, a texture, a density, a viscosity, a velocity, a location, an intensity, a luminance, a luminescence, a luster, or a concentration may also be estimated. In one aspect, the exact physical property such as, for example, the volume is not to be precisely calculated but to select a measure or estimated measurement of the physical property such as, for example, the volume. For example, a Likert scale may be used to measure how full a shopping cart or laundry basket is. The type of items in the image may be identified. If the items in the image are unable to be identified, an identification application, such as, for example, a dialog application may be used to obtain details about the items (e.g. automate branching conversations between a user and an application on the image capturing device). Based on the image analysis, one or more household devices associated with a task related to the image may be selected. For example, the laundry basket may be associated with the IoT devices, such as a washer and dryer, or a shopping cart may be associated with a freezer and/or refrigerator. In some instances, the selection may be a single IoT device. Alternately, the selection may be a set of devices in a time sequence. For example, an image of the laundry basket may result in first selecting a washer and then selecting a dryer 25 minutes after the washer begins operation, and then a vent and exhaust device system 10 minutes after the dryer begins operation. For each identified device, based on the image analysis, an appropriate IoT device setting may be selected and/or preconfigured. A mapping, corresponding to the physical property (e.g., volume) measures and types of items, may be centrally maintained. The preconfigured settings may be communicated to the selected IoT devices based on the time sequence.

For example, a user may be at the grocery store and takes a picture of their shopping cart. The image may then be transmitted to the user's home Wi-Fi router and/or central processor unit, which may be associated with the IoT device (e.g., refrigerator). Upon analyzing the image, the appropriate temperature and/or moisture settings of the freezer and refrigerator may be preconfigured and selected.

As an additional example, the user may take a picture of a laundry basket with dirty clothes. The settings may be selected and/or preconfigured for the washer and then selecting a dryer 25 minutes after the washer begins operation, and then a vent and exhaust device system 10 minutes after the dryer begins operation.

In order for the correct identification to occur, a visual recognition engine may be trained and employ to be trained with similar images. This training and development of a knowledge base may be performed centrally via crowd-sourcing or via machine learning. Specific to the identification of the physical property (e.g., volume), a combination of different images may also be necessary. For example, a large laundry basket that is half full and a small basket that is overflowing may result in the same physical property (e.g., volume). To enable the correct, physical property (e.g., volume) determination, the make and/or model of the basket may need to be maintained as part of the knowledge base.

In one aspect, as pertaining to the dialog service, for example, an overflowing shopping cart may conceal one or more items hidden at the bottom of the cart. Using the dialog service, one or more queries may be sent to the image capturing device such as, for example, "Are there any freezer products in the shopping cart?" or "Do you have any dairy products?"

Also, it should be noted that both the visual recognition service and the dialog service may need to be continuously learning via a feedback mechanism. After a device setting is transmitted to the appliance if the user were to update the setting, that update may be transmitted and may now be associated with the task corresponding to the initial image characteristics. In this way, the present invention may learn user specific differences such as, for example, a white laundry basket containing white clothes corresponds to hot/hot wash cycle while blue laundry basket with white clothes may correspond to a warm/cold wash cycle. Similarly, an unchanged setting may be transmitted back to the image capturing device or even the IoT device and positively reinforces that association between the picture characteristics and the settings.

Thus, in one aspect, the present invention provides one or more novel features for determining an action or task based on the cognitive analysis of the image, such as by employing a visual recognition application/service and then selecting one or more devices associated with the action or task. Each operation of these multiple devices may be sequential by transmitting operating instructions. For example, an image of a user's shopping cart at the supermarket may 1) select the car of the user to adjust trunk spacing; (2) adjust moisture setting in a refrigerator, and (3) adjust temperature in the freezer.

Figure 5:
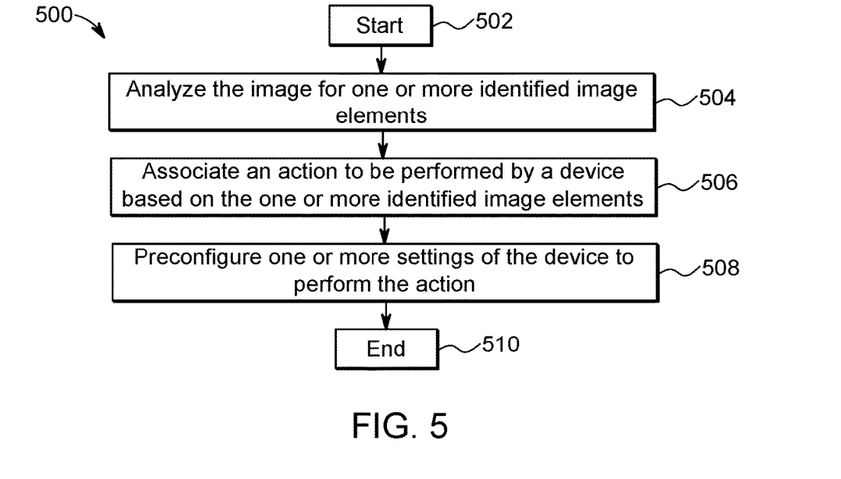
FIG. 5 is a flowchart diagram depicting an additional exemplary method for configuring settings for various computer-controlled devices using image analysis by a processor, again in which aspects of the present invention may be realized.

Turning now to FIG. 5, a method 500 for configuring settings for various computer-controlled devices using image analysis by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502. An image (or video) may be analyzed for one or more identified image elements, as in block 504. An action to be performed by a device may be associated based on the one or more identified image elements, as in block 506. One or more settings of the device may be preconfigured to perform the action, as in block 508. The functionality 500 may end in block 510.

Figure 6:
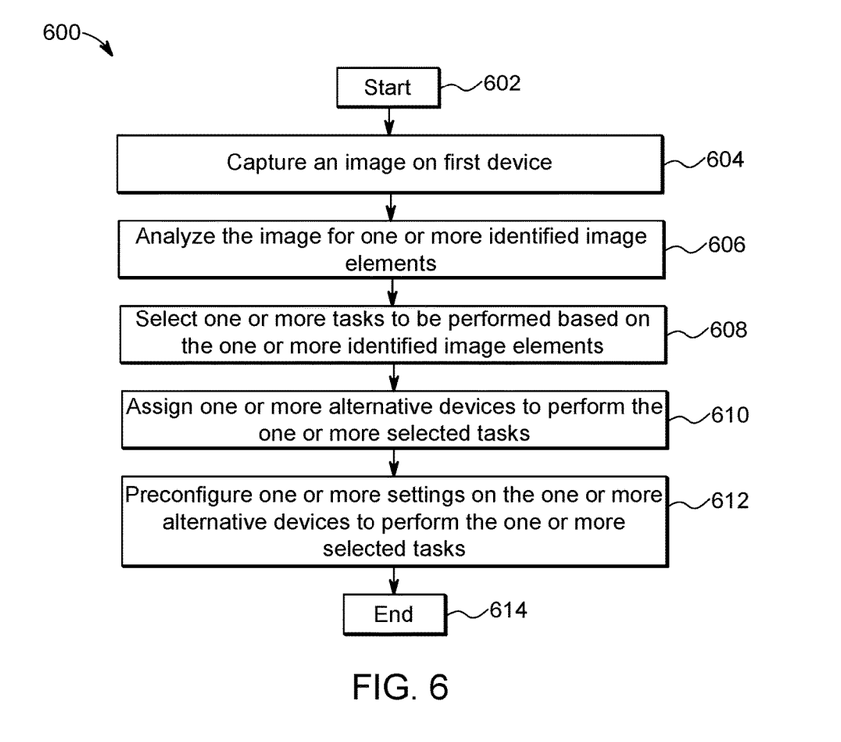
FIG. 6 is an additional flowchart diagram depicting an exemplary method for configuring settings for various computer-controlled devices using image analysis by a processor; again, in which aspects of the present invention may be realized.

Turning now to FIG. 6, an additional method 600 for configuring settings for various computer-controlled devices using image analysis by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602. An image (or video) may be captured on a first device, as in block 604. The image may be analyzed for one or more identified image elements, as in block 606. One or more tasks may be selected to be performed based on the one or more identified image elements, as in block 608. One or more alternative devices may be assigned to perform the one or more selected tasks, as in block 610. One or more settings may be preconfigured on the one or more alternative devices to perform the one or more selected tasks, as in block 612. The functionality 600 may end in block 614.

In one aspect, in conjunction with and/or as part of at least one block of FIG. 5 or 6, the operations of methods 500 and/or 600 may include each of the following. The operations of methods 500 and/or 600 may include, based on the one or more identified image elements, selecting the device from an available plurality of devices to perform the action. Also, the device may be identified from an available plurality of devices to perform the action. The location and/or distance of the available plurality of devices in relation to the one or more identified image elements may be determined. One or more devices from the available plurality of devices may be selected to perform the action based on the one or more identified image elements. Also, one or more devices may be selected from an available plurality of devices to perform the action based on the one or more identified image elements and a closest proximity, closest access path, and/or travel route (e.g., a shortest route or shortest travel time) to the one or more identified image elements. Based on the one or more identified image elements, one or more settings of an additional device may be preconfigured for performing an additional action in sequence with the action associated with the device.

For example, a user's home or business may have multiple floors that may each include a washer and dryer. The identified image elements may be determined to be on the first floor near the west end of the home or business. As such, a washer located on the east end of the home but on the first floor may be selected as compared to a washer located on the west end of the home but located on the second floor. This may be because even though the washer is located directly above the one or more identified image elements and closer to as compared to the washer on the west end of the home, the washer on the east end of the home has an access path or travel route that takes less time to access the one or more identified image elements. That is, the user merely has to walk directly down the hall from the one or more identified image elements (e.g., laundry basket) to the washer on the east end of the home. This is in comparison to the washer located on the west end of the home but located on the second floor, which requires the user to travel from the west end of the home on the first floor of the location of the one or more identified image elements back to the east end of the home and then take the stairs located at the east end up to the second floor and then proceed directly down the hall to the washer located on the west end of the home and located on the second floor.

Pursuant to identifying the image elements, a physical property associated with the image may be estimated to be subsequently used in determining one or more aspects of the performed action. Pursuant to estimating the physical property associated with the image, a mass, an area, a volume, a length, a width, a height, a color, a temperature, an odor, an appearance, a texture, a density, a viscosity, a velocity, a location, an intensity, a luminance, a luminescence, a luster, or a concentration may also be estimated. The operations of methods 500 and/or 600 may include querying a user for additional data supplanting the one or more identified image elements to associate the action.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for processing an image, comprising:
   analyzing the image for one or more identified image elements, the one or more identified image elements comprising a non-electrical household object associated with a task workflow;
   associating an action to be performed by a device based on the one or more identified image elements;
   preconfiguring one or more settings of the device to perform the action;
   identifying the device from an available plurality of devices to perform the action;
   determining a location of the available plurality of devices in relation to the one or more identified image elements; and
   selecting the device from an available plurality of devices to perform the action based on the one or more identified image elements and a closest proximity to the one or more identified image elements.

2. The method of claim 1, further including capturing the image as provided by a user.

3. The method of claim 1, further including, pursuant to identifying the image elements, estimating a physical property associated with the image to be subsequently used in determining one or more aspects of the performed action.

4. The method of claim 3, further including, pursuant to estimating the physical property associated with the image, estimating a mass, an area, a volume, a length, a width, a height, a color, a temperature, an odor, an appearance, a texture, a density, a viscosity, a velocity, a location, an intensity, a luminance, a luminescence, a luster, or a concentration.

5. The method of claim 1, further including querying a user for additional data supplanting the one or more identified image elements to associate the action.

6. The method of claim 1, further including, based on the one or more identified image elements, preconfiguring one or more settings and an additional device for performing an additional action in sequence with the action associated with the device, wherein the device and the additional device are in an Internet of Things (IoT) Network.

7. A system for processing an image, comprising:
   one or more processors, that:
      analyze the image for one or more identified image elements, the one or more identified image elements comprising a non-electrical household object associated with a task workflow,
      associate an action to be performed by a device based on the one or more identified image elements,
      preconfigure one or more settings of the device to perform the action;
      identify the device from an available plurality of devices to perform the action,
      determine a location of the available plurality of devices in relation to the one or more identified image elements, and
      select the device from an available plurality of devices to perform the action based on the one or more identified image elements and a closest proximity to the one or more identified image elements.

8. The system of claim 7, wherein the one or more processors capture the image as provided by a user.

9. The system of claim 7, wherein the one or more processors, pursuant to identifying the image elements, estimate a physical property associated with the image to be subsequently used in determining one or more aspects of the performed action.

10. The system of claim 9, wherein the one or more processors, pursuant to estimating the physical property associated with the image, estimate a mass, an area, a volume, a length, a width, a height, a color, a temperature, an odor, an appearance, a texture, a density, a viscosity, a velocity, a location, an intensity, a luminance, a luminescence, a luster, or a concentration.

11. The system of claim 7, wherein the one or more processors query a user for additional data supplanting the one or more identified image elements to associate the action.

12. The system of claim 7, wherein the one or more processors, based on the one or more identified image elements, preconfigure one or more settings and additional devices for performing an additional action in sequence with the action associated with the device, wherein the device and the additional device are in an Internet of Things (IoT) Network.

13. A computer program product, for processing an image by one or more processors, the computer program product comprising a non-transitory computer-readable storage medium having computer-readable program code portions stored therein, the computer-readable program code portions comprising:
   an executable portion that analyzes the image for one or more identified image elements, the one or more identified image elements comprising a non-electrical household object associated with a task workflow;
   an executable portion that associates an action to be performed by a device based on the one or more identified image elements;
   an executable portion that preconfigures one or more settings of the device to perform the action;
   an executable portion that identifies the device from an available plurality of devices to perform the action;
   an executable portion that determines a location of the available plurality of devices in relation to the one or more identified image elements; and
   an executable portion that selects the device from an available plurality of devices to perform the action based on the one or more identified image elements and a closest proximity to the one or more identified image elements.

14. The computer program product of claim 13, further including an executable portion that captures the image as provided by a user.

15. The computer program product of claim 13, further including an executable portion that, pursuant to identifying the image elements, estimates a physical property associated with the image to be subsequently used in determining one or more aspects of the performed action.

16. The method of claim 15, further including an executable portion that, pursuant to estimating the physical property associated with the image, estimates a mass, an area, a volume, a length, a width, a height, a color, a temperature, an odor, an appearance, a texture, a density, a viscosity, a velocity, a location, an intensity, a luminance, a luminescence, a luster, or a concentration.

17. The computer program product of claim 13, further including an executable portion that queries a user for additional data supplanting the one or more identified image elements to associate the action.

18. The computer program product of claim 13, further including an executable portion that, based on the one or more identified image elements, preconfigures one or more settings and additional devices for performing an additional action in sequence with the action associated with the device, wherein the device and the additional device are in an Internet of Things (IoT) Network.

\* \* \* \* \*